United States Patent

[11] 3,633,486

[72] Inventor: Tatsuo Asazuma, Tokyo-to, Japan
[21] Appl. No.: 877,980
[22] Filed: Nov. 19, 1969
[45] Patented: Jan. 11, 1972
[73] Assignee: Cosmicar Kogaku Kabushiki Kaisha, Tokyo-to, Japan
[32] Priority: May 7, 1969
[33] Japan
[31] 44/41176

[54] APERTURE CONTROLS FOR PHOTOGRAPHIC APPARATUS
2 Claims, 4 Drawing Figs.

[52] U.S. Cl. ............................................. 95/64 D, 95/10 C, 352/141
[51] Int. Cl. ....................................... G03b 7/08, G03b 9/06
[50] Field of Search .......................... 95/10 C, 64, 64 D; 352/141

[56] References Cited
UNITED STATES PATENTS

| | | | |
|---|---|---|---|
| 3,124,033 | 3/1964 | Freudenschuss | 352/141 |
| 3,357,779 | 12/1967 | Suigussaar | 352/141 |
| 3,394,642 | 7/1968 | Teshi et al. | 352/141 X |
| 3,419,325 | 12/1968 | Mayr et al. | 352/141 X |
| 3,421,812 | 1/1969 | Kubota | 352/141 |
| 3,459,113 | 8/1969 | Falkenburg | 95/64 |
| 3,456,570 | 7/1969 | Heinzmann | 95/64 |

Primary Examiner—Joseph F. Peters, Jr.
Attorney—Steinberg & Blake

ABSTRACT: A photographic apparatus having a structure for automatically determining the exposure aperture according to the lighting conditions. An electrical circuit is provided with a switch for opening and closing the circuit. A photosensitive resistor is connected with the circuit for influencing the current flowing therethrough according to the intensity of the light which is received by the photosensitive resistor. An adjustable diaphragm is provided to determine the size of the exposure aperture, and this diaphragm has a fully closed position where no aperture is provided. A moving coil instrument is operatively connected with the circuit and with the diaphragm for automatically adjusting the latter according to the intensity of the light which is received by the photosensitive resistor. When the switch opens the circuit, the moving coil instrument automatically places the diaphragm in its fully closed position, so that when the structure is not used, with the circuit open, no light will pass through an objective with which the diaphragm coacts.

INVENTOR
TATSUO ASAZUMA

INVENTOR
TATSUO ASAZUMA
BY
Steinberg & Blake
ATTORNEYS

APERTURE CONTROLS FOR PHOTOGRAPHIC APPARATUS

BACKGROUND OF THE INVENTION

The present invention relates to photographic apparatus.

In particular, the present invention relates to structure for determining the exposure aperture of a photographic apparatus.

As is well known, it is possible to provide a structure which will automatically respond to the lighting conditions so as to determine automatically the magnitude of the exposure aperture. With conventional structures of this type, however, various drawbacks and problems are encountered. For example, variations in a power source or in the operating temperature can undesirably influence the size of the aperture so as to provide an exposure which is not proper for the prevailing lighting conditions. Thus, the conventional structures do not have a desired stability under various operating conditions. Thus, when the photographic apparatus is used indoors and outdoors, the magnitude of the exposure aperture will be determined in part according to whether the device is indoors or outdoors, and such influences should have no effect on the determination of the exposure aperture. In other words assuming that the same lighting conditions prevail indoors and outdoors, the same aperture should be provided, assuming that all other variables remain constant, but this result cannot be achieved with the present state of the art.

Furthermore, it is conventional with known structures of the above type to provide for the diaphragm a fully open position when the photographic apparatus is not used so that the electrical circuit is open. Under these conditions it is possible for light to flow freely through an objective of the photographic apparatus and undesirably affect a light-sensitive surface such as an unexposed film surface, even before the electrical circuit is closed to set into operation the structure which will automatically determine the proper exposure aperture.

The above drawbacks are encountered particularly in TV cameras where troubles are frequently encountered in the image tube and its related mechanism as a result of the fact that the largest aperture is provided when the current is turned off and as a result of the variable power source and temperatures under which operations are carried out.

SUMMARY OF THE INVENTION

It is accordingly a primary object of the present invention to provide a construction which will avoid the above drawbacks.

In particular, it is an object of the invention to provide a construction which will achieve stability under a wide variety of operating conditions and irrespective of whether the apparatus is used indoors or outdoors.

Furthermore, it is an object of the present invention to provide a construction which will eliminate the possibility of light traveling through the objective to reach a light-sensitive surface when the apparatus is not used.

According to the invention, the structure includes an electrical circuit means provided with a switch for opening and closing the circuit means. A photosensitive means is operatively connected with this circuit means for influencing the flow of current therethrough according to the intensity of the light which is received by the photosensitive means. An adjustable diaphragm means is provided for determining the exposure aperture, and this diaphragm means has a fully closed position where no exposure aperture is provided thereby. A meter means is operatively connected with the diaphragm means and with the electrical circuit means for adjusting the diaphragm means to provide an exposure aperture according to the intensity of the light which is received by the photosensitive means. When the switch opens the circuit means the meter means automatically places the diaphragm means in its fully closed position. The circuit means is preferably a bridge circuit across which the meter means is connected and having one arm formed by the photosensitive means which is preferably a photosensitive resistor.

BRIEF DESCRIPTION OF DRAWINGS

The invention is illustrated by way of example in the accompanying drawings which form part of this application and in which.

DESCRIPTION OF PREFERRED EMBODIMENTS

Figure 3:
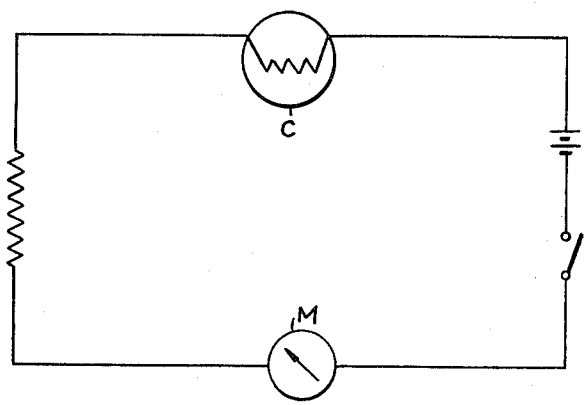
FIG. 3 is an illustration of a conventional circuit.

Referring first to the conventional circuit diagram which is illustrated in FIG. 3 it will be seen that the illustrated series includes a photosensitive resistor C which may be a CdS resistor, as is well known. A meter M of the moving coil type is connected into the circuit so as to be operated thereby, the circuit including a source of current, a switch, and an additional fixed resistor as shown in FIG. 3.

The meter M is operatively connected in a known manner with an adjustable diaphragm in order to adjust automatically the aperture provided thereby. For example, the shaft of the meter may be connected to one diaphragm blade operatively linked with a second blade in a manner simultaneously turning both blades in order to adjust the size of the aperture.

With a conventional construction of this type, when the circuit is open to provide the meter with its zero or rest position, the diaphragm is in its fully open position providing the largest aperture. As a result when the switch of the circuit is opened, so as to open the circuit, placing the structure in a position of nonuse, light can travel freely through the aperture which is provided at this time. The result is that such light can undesirably affect and often damage a light-sensitive surface. In the case of a TV camera, the function of an image tube thereof and its related mechanism is often undesirably affected and damaged because of this conventional construction.

Therefore, in order to avoid this result with the conventional constructions it is necessary to cover the objective with a suitable cap. Each time such a TV camera is placed in a position of nonuse it is necessary for the operator to place the cap on the objective, so that whenever the operations are completed the operator must remember to place the cap on the objective to prevent light from traveling therethrough. Of course, such a cap can become lost and the necessity of mounting and removing such a cap is a great convenience.

In accordance with the present invention when the switch is opened, so as to open the electrical circuit and place the meter in its zero position of nonuse, the diaphragm is fully stopped down and provides no aperture through which light can travel. Therefore, with such a construction a cap of the above type is not required and at the same time whenever the apparatus is turned off and is not used it is not possible for light to travel through the objective.

Figure 2:
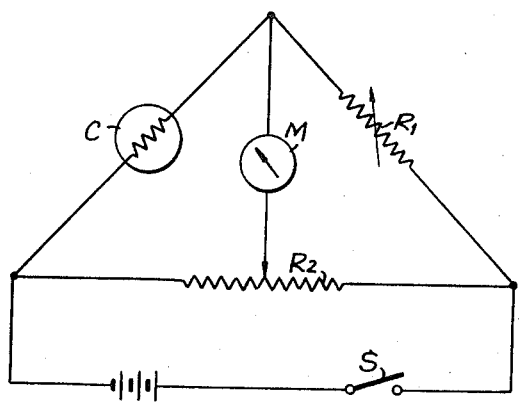
FIG. 2 is an illustration of a circuit means of the invention.

Referring to FIG. 2, the circuit means of the invention which is illustrated therein takes the form of the illustrated bridge circuit across which the meter means M of the moving coil type is connected in the manner illustrated. One arm of the bridge circuit is formed by the photosensitive resistor C which also may be made CdS. The other arms of the bridge circuit include the variable resistors $R_1$ and $R_2$. These resistors are adjusted according to the angle through which the moving coil of the instrument M turns, and thus through these variable resistors it is possible to adjust the operation of the meter so that it will respond accurately to the intensity of the light received by the photosensitive means C. The circuit means of FIG. 2 includes the switch S which is closed to close the circuit means and opened to open the circuit means.

Figure 1:
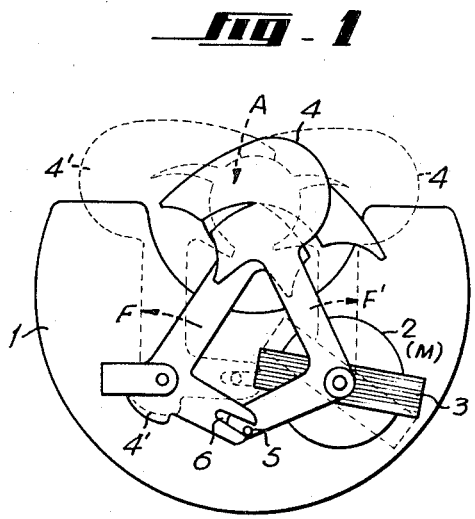
FIG. 1 is a schematic front elevation of an adjustable diaphragm and meter operatively connected therewith, the diaphragm being shown in solid lines in its fully closed position and in dotted lines in an open position.
Figure 4:
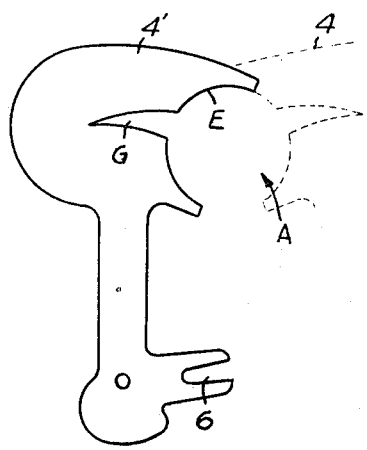
FIG. 4 shows, by itself, one of the diaphragm blades of FIG. 1.

Referring to FIG. 1, the baseplate 1 is diagrammatically illustrated carrying the meter M which is provided with the magnet 2 and the moving, rotary coil 3 which is fixed with the diaphragm blade 4. The baseplate 1 pivotally supports an oppositely oriented but identical diaphragm blade 4' which together with the blade 4 determines the diaphragm aperture. For this purpose the blade 4 has fixed thereto a pin 5 received in a notch or slot 6 which is formed in an arm of the blade 4', so that the blades will move equally and oppositely. As is apparent particularly from FIG. 4, the blades have at their overlapping aperture-determining ends inner arcuate edges E forming part of the circle and V-notches G extending from the edges E respectively.

When the moving coil instrument M is in the solid line position shown in FIG. 1, the diaphragm means 4, 4' is also in the solid line position, and it will be seen that in this position the V-notches G have swung inwardly slightly beyond each other so that no exposure aperture whatever is provided and it is not possible for any light to travel through the objective. This is the position of nonuse, corresponding to the zero position which results from opening of the switch S of FIG. 2, so as to open the circuit means illustrated therein.

On the other hand, when the switch S is closed, the light which is received by the photosensitive resistor C will through the bridge circuit of the invention act on the meter to place the moving coil 3 thereof at an angular position which will situate the diaphragm means 4, 4' at a position which will determine the magnitude of the exposure aperture. This magnitude can range all the way from an extremely small aperture, even no aperture when the apparatus is not used, up to a relatively large aperture A indicated in FIGS. 1 and 4 where the fully open position of the diaphragm is illustrated. Of course, the structure operates in such a way that as the light intensity increases the magnitude of the aperature automatically diminishes while as the light intensity decreases the magnitude of the aperture automatically increases, so that in this way the structure responds automatically to provide a proper exposure according to the lighting conditions.

It will be noted that in the fully open position of the diaphragm means, the edges E cooperate to form a substantially circular exposure aperture A.

Thus, it is apparent that with the structure described above, when the photographic apparatus, such as TV camera, is not used the diaphragm provides no aperture through which light can enter. In the case of a TV camera, the image tube and its related mechanism operate without any failure when using the structure of the invention. The bridge circuit for achieving a system shunting and dividing the potential will result in minimizing any possible undesirable influences from variations in the power source or temperature. With this arrangement there is a highly improved stability of operation, under a wide variety of operating conditions. Thus, for example, it is immaterial with the invention whether the structure is used indoors or outdoors.

What is claimed is:

1. In a photographic apparatus, electrical circuit means having a switch for opening and closing said electrical circuit means, photosensitive means operatively connected with said electrical circuit means for influencing the flow of current therethrough according to the intensity of light received by said photosensitive means, adjustable diaphragm means for providing an exposure aperture the magnitude of which is determined by the adjustment of said diaphragm means, the latter having a fully closed position where no exposure aperture is provided, and meter means operatively connected to said circuit means and to said diaphragm means for automatically adjusting the latter to provide an exposure aperture according to the intensity of light received by said photosensitive means, said meter means automatically placing said diaphragm means in said fully closed position thereof when said circuit means is opened by said switch, so that no exposure aperture is provided when current does not flow through said circuit means.

2. The combination of claim 1 and wherein said circuit means is a bridge circuit one arm of which is formed by said photosensitive means, other arms of said bridge circuit including variable resistors and said meter means being a moving coil instrument, said diaphragm means including a pair of diaphragm blades one of which is operatively connected with said instrument to be turned thereby and the other of which is oriented oppositely to said one blade and linked therewith for carrying out movements equal and opposite to said one blade upon movement of the latter by said instrument.

* * * * *